United States Patent
Kim et al.

(10) Patent No.: US 11,037,730 B2
(45) Date of Patent: Jun. 15, 2021

(54) ELECTRONIC COMPONENT HAVING METAL FRAMES WITH INSULATING LAYERS THEREON

(71) Applicant: SAMSUNG ELECTRO-MECHANICS CO., LTD., Suwon-si (KR)

(72) Inventors: Ho Yoon Kim, Suwon-si (KR); Woo Chul Shin, Suwon-si (KR); Sang Soo Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/200,373

(22) Filed: Nov. 26, 2018

(65) Prior Publication Data

US 2020/0111614 A1 Apr. 9, 2020

(30) Foreign Application Priority Data

Oct. 8, 2018 (KR) .................. 10-2018-0119607

(51) Int. Cl.
*H01G 4/224* (2006.01)
*H01G 4/232* (2006.01)
(Continued)

(52) U.S. Cl.
CPC .......... *H01G 4/224* (2013.01); *H01G 4/2325* (2013.01); *H01G 4/248* (2013.01); *H01G 4/30* (2013.01);
(Continued)

(58) Field of Classification Search
CPC .......... H01G 4/005; H01G 4/08; H01G 4/012; H01G 4/30; H01G 4/248; H01G 4/1227; H01G 4/232; H01G 4/2325; H01G 4/224
See application file for complete search history.

(56) References Cited

U.S. PATENT DOCUMENTS 8,912,876 B2 * 12/2014 Gomi .................. H01C 7/10
338/21
9,082,532 B2 7/2015 Itagaki et al.
(Continued)

FOREIGN PATENT DOCUMENTS

JP 2012-23303 A 2/2012
JP 2012-33632 A 2/2012
(Continued)

OTHER PUBLICATIONS

Office Action issued in Korean Application No. 10-2018-0119607 dated Sep. 11, 2019, with English translation.

*Primary Examiner* — David M Sinclair
(74) *Attorney, Agent, or Firm* — Morgan, Lewis & Bockius LLP

(57) ABSTRACT

An electronic component includes a body; first and second external electrodes including first and second connection portions and first and second band portions, respectively; and first and second metal frames connected to the first and second external electrodes, respectively, wherein the first and second metal frames include first and second support portions bonded to the first and second connection portions, and first and second mounting portions extended in the first direction from lower ends of the first and second support portions and spaced apart from the body and the first and second external electrodes, and further include first and second insulating layers formed on external surfaces of the first and second support portions.

20 Claims, 8 Drawing Sheets

(51) Int. Cl.
*H01G 4/248* (2006.01)
*H01G 4/30* (2006.01)
*H01G 4/012* (2006.01)
*H01G 4/12* (2006.01)
*H01G 4/008* (2006.01)

(52) U.S. Cl.
CPC ............. *H01G 4/008* (2013.01); *H01G 4/012* (2013.01); *H01G 4/1227* (2013.01); *H01G 4/1245* (2013.01)

(56) References Cited

U.S. PATENT DOCUMENTS

| | | | | |
|---|---|---|---|---|
| 9,171,672 | B2* | 10/2015 | McConnell | H01G 4/38 |
| 9,966,191 | B2* | 5/2018 | Noda | H01G 4/30 |
| 2008/0024960 | A1* | 1/2008 | Hidaka | H05K 5/0095 |
| | | | | 361/807 |
| 2010/0123995 | A1* | 5/2010 | Otsuka | H01G 2/06 |
| | | | | 361/308.1 |
| 2011/0043963 | A1* | 2/2011 | Bultitude | H01G 4/40 |
| | | | | 361/321.4 |
| 2013/0343027 | A1* | 12/2013 | Perea | H01C 1/14 |
| | | | | 361/813 |
| 2014/0124251 | A1 | 5/2014 | Park et al. | |
| 2014/0198427 | A1* | 7/2014 | Kamobe | H01G 4/30 |
| | | | | 361/301.4 |
| 2014/0345926 | A1* | 11/2014 | Lee | H01G 4/30 |
| | | | | 174/260 |
| 2014/0360764 | A1* | 12/2014 | Kim | H01G 4/30 |
| | | | | 174/260 |
| 2014/0376155 | A1* | 12/2014 | Omori | H01G 4/228 |
| | | | | 361/301.4 |
| 2015/0054388 | A1 | 2/2015 | Itagaki et al. | |
| 2015/0296623 | A1* | 10/2015 | Trinh | H01L 23/498 |
| | | | | 174/260 |
| 2016/0126013 | A1* | 5/2016 | Park | H01G 4/30 |
| | | | | 174/260 |
| 2016/0212843 | A1* | 7/2016 | Park | H01G 4/01 |
| 2016/0343506 | A1* | 11/2016 | Lee | H01G 4/232 |
| 2017/0076865 | A1* | 3/2017 | Tanaka | H01G 4/224 |
| 2017/0127520 | A1* | 5/2017 | Park | H05K 1/181 |
| 2017/0164479 | A1* | 6/2017 | Park | H01G 2/065 |
| 2017/0287645 | A1* | 10/2017 | Masuda | H01G 4/2325 |
| 2017/0316878 | A1* | 11/2017 | Peuser | H01G 2/06 |

FOREIGN PATENT DOCUMENTS

| | | |
|---|---|---|
| JP | 2016219482 A * | 12/2016 |
| JP | 6201900 B2 | 9/2017 |
| KR | 10-1422929 B1 | 7/2014 |
| KR | 10-2015-0021471 A | 3/2015 |

* cited by examiner

ELECTRONIC COMPONENT HAVING METAL FRAMES WITH INSULATING LAYERS THEREON

CROSS-REFERENCE TO RELATED APPLICATION(S)

This application claims the benefit of priority to Korean Patent Application No. 10-2018-0119607 filed on Oct. 8, 2018 in the Korean Intellectual Property Office, the disclosure of which is incorporated herein by reference in its entirety.

BACKGROUND

1. Field

The present disclosure relates to an electronic component.

2. Description of Related Art

Multilayer capacitors are used in various electronic devices due to being able to be implemented with a small size and high capacity and may be easily mounted.

The multilayer capacitor may have a structure in which a plurality of dielectric layers and internal electrodes having different polarities and alternately disposed between the dielectric layers are stacked.

Here, since the dielectric layers have a piezoelectric property, a piezoelectric phenomenon may occur between the internal electrodes when direct current (DC) or alternating current (AC) voltages are applied to the multilayer ceramic capacitor to thereby generate periodic vibrations while expanding and contracting a volume of a capacitor body, depending on a frequency.

These vibrations may be transferred to a substrate through external electrodes of the multilayer ceramic capacitor and solders connecting the external electrodes and the substrate to each other, such that the entirety of the substrate may act as a sound reflecting surface to generate vibration sound, known as noise.

Such a vibration sound may correspond to an audible frequency in the range of 20 to 20,000 Hz causing listener discomfort. The vibration sound causing listener discomfort, as described above, is known as acoustic noise.

Meanwhile, as a method for reducing such acoustic noise, there is provided an electronic component having a structure in which the multilayer capacitor is mounted to be spaced apart from a substrate by a predetermined distance by using a metal frame to prevent the vibrations generated by the multilayer capacitor from being transferred to the substrate.

However, in the case of the conventional electronic component using the metal frame, when a position and a direction of the metal frame are deviated from a regular position and direction on the design, at the time of mounting the electronic component on the substrate, a mounting portion of the metal frame may be in contact with other adjacent land patterns, which may result in a short circuit defect between the components.

SUMMARY

An aspect of the present disclosure may provide an electronic component capable of preventing a short circuit defect between components by preventing an adjacent metal frame from being in contact with a metal frame of another component when the electronic component is mounted on a substrate while reducing acoustic noise.

According to an aspect of the present disclosure, an electronic component may include a body; first and second external electrodes including first and second connection portions formed on opposing surfaces of the body in a first direction, and first and second band portions extended from the first and second connection portions to portions of upper and lower surfaces of the body and portions of opposite side surfaces of the body, respectively; and first and second metal frames connected to the first and second external electrodes, respectively, wherein the first and second metal frames include first and second support portions bonded to the first and second connection portions, and first and second mounting portions extended in the first direction from lower ends of the first and second support portions and spaced apart from the body and the first and second external electrodes, and further include first and second insulating layers formed on external surfaces of the first and second support portions.

The thickness of each of the first and second insulating layers may be 0.7 μm or more.

The electronic component may further include a capsule portion including the first and second insulating layers and further covering the body and the first and second external electrodes.

The body may include dielectric layers, and first and second internal electrodes alternatively disposed while having the dielectric layer interposed therebetween and exposed in the first direction through the opposing surfaces of the body so that one end of each of thereof is connected to each of the first and second connection portions.

First and second conductive adhesive layers may be provided between the first and second connection portions of the first and second external electrodes and the first and second support portions.

The electronic component may further include a plating layer formed on the first and second external electrodes and the first and second metal frames, respectively.

The plating layer may include a nickel plating layer and a tin plating layer covering the nickel plating layer.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
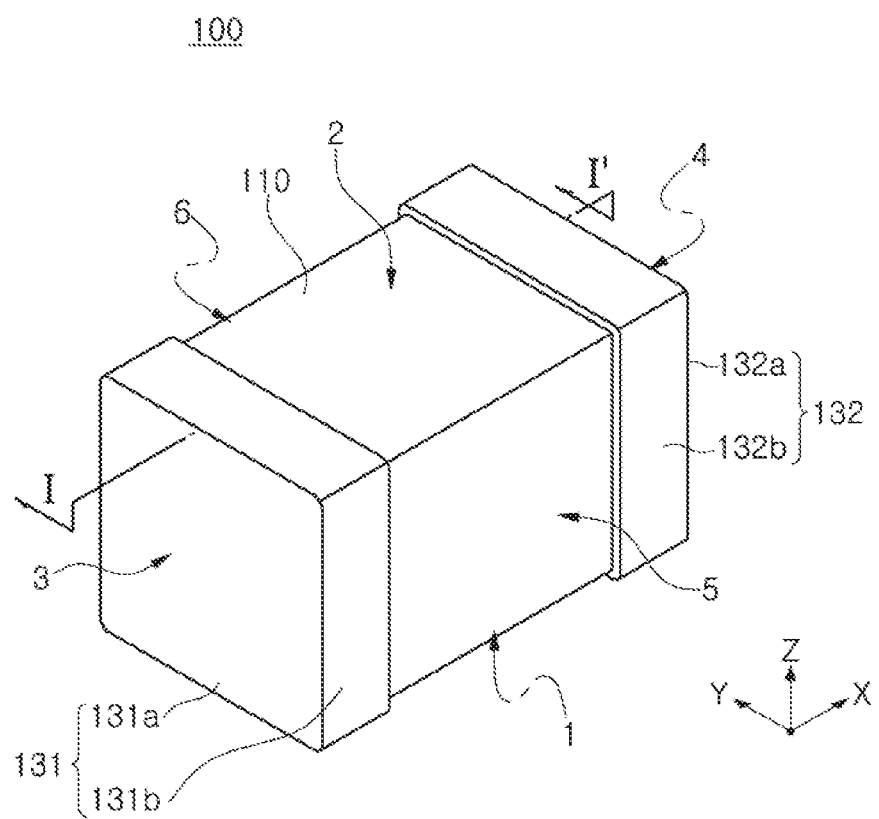
FIG. 1 is a perspective view schematically illustrating a multilayer capacitor applied to an exemplary embodiment in the present disclosure.

Hereinafter, exemplary embodiments of the present disclosure will now be described in detail with reference to the accompanying drawings.

Directions will be defined in order to clearly describe exemplary embodiments in the present disclosure. X, Y and Z in the drawings refer to a length direction, a width direction, and a thickness direction of a multilayer capacitor and an electronic component, respectively.

Here, the Z direction refers to a stacked direction in which dielectric layers are stacked in the present exemplary embodiment.

Figure 2A:
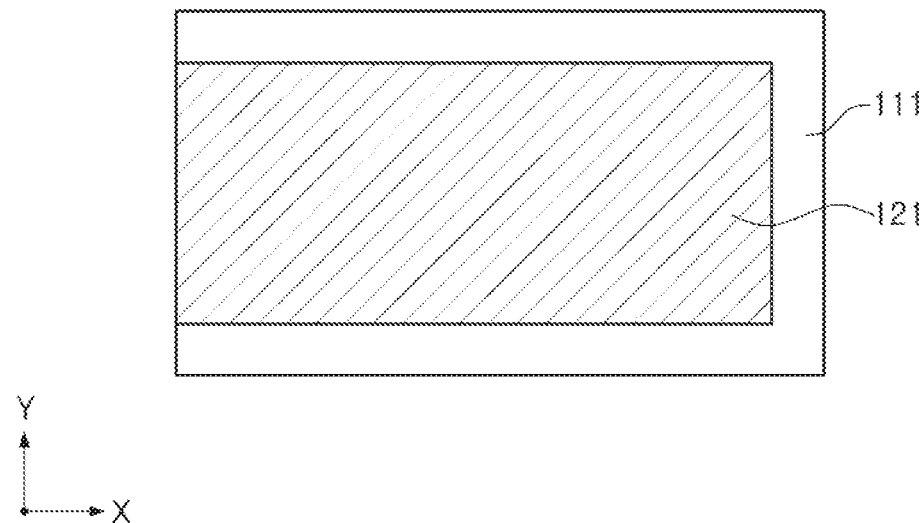
FIGS. 2A and 2B are plan views illustrating first and second internal electrodes applied to the multilayer capacitor of FIG. 1.
Figure 2B:
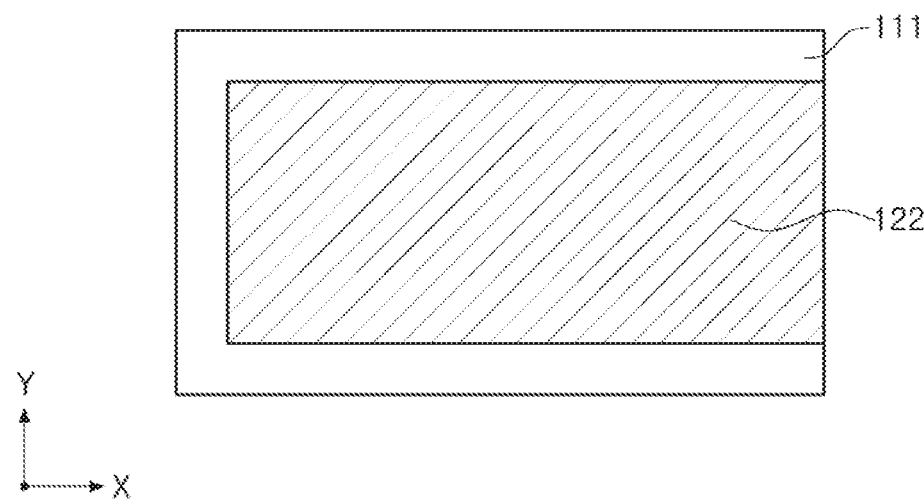
Figure 3:
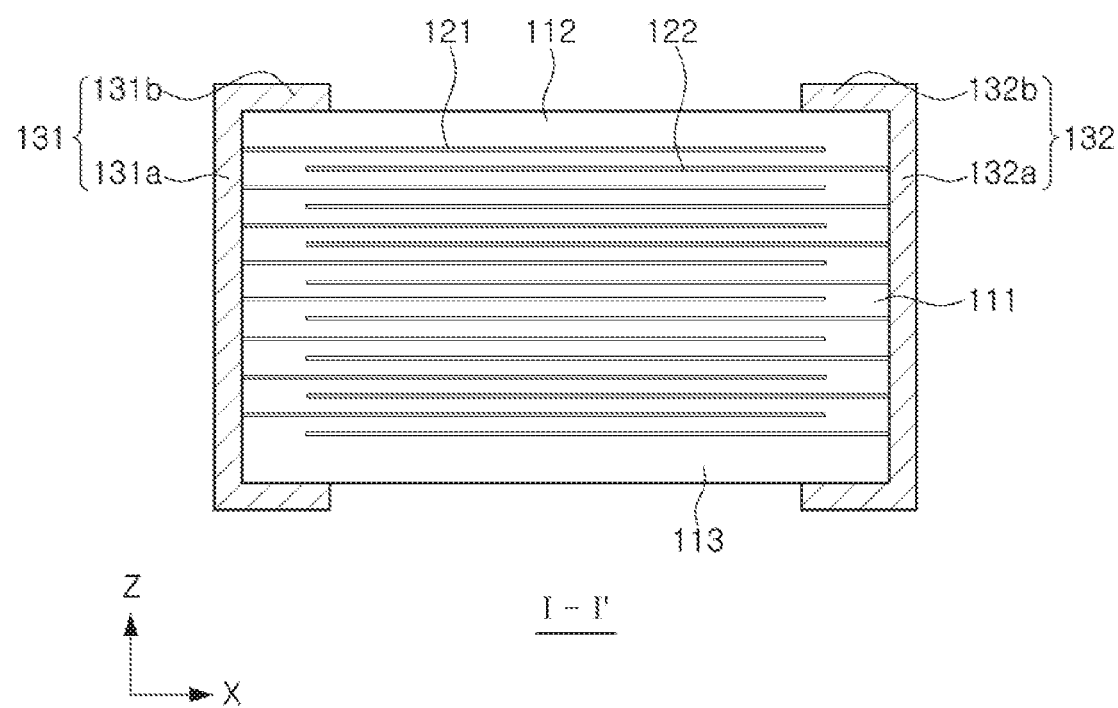
FIG. 3 is a cross-sectional view taken along a line I-I' of FIG. 1.

FIG. 1 is a perspective view schematically illustrating a multilayer capacitor applied to an exemplary embodiment in the present disclosure, FIGS. 2A and 2B are plan views illustrating first and second internal electrodes applied to the multilayer capacitor of FIG. 1, and FIG. 3 is a cross-sectional view taken along a line I-I' of FIG. 1.

First, a structure of a multilayer capacitor applied to an electronic component according to the present exemplary embodiment will be described with reference to FIGS. 1 through 3.

Referring to FIGS. 1 through 3, a multilayer capacitor 100 according to the present exemplary embodiment may include a body 110, and first and second external electrodes 131 and 132 formed on opposite end surfaces of the body 110, respectively, in an X direction, which is a first direction of the body 110.

The body 110 may be formed by stacking a plurality of dielectric layers 111 in a Z direction of the body 110 and then sintering the plurality of dielectric layers 111. The dielectric layers 111 adjacent to each other of the body 110 may be integrated with each other so that boundaries therebetween are not readily apparent without using a scanning electron microscope (SEM).

In addition, the body 110 may include the plurality of dielectric layers 111, and first and second internal electrodes 121 and 122 having different polarities alternately disposed in the Z direction of the body 110 while having the dielectric layers 111 interposed therebetween.

In addition, the body 110 may include an active region as a portion contributing to forming a capacitance of the capacitor, and cover regions 112 and 113 provided on upper and lower surfaces of the active region in the Z direction as margin portions.

A shape of the body 110 is not particularly limited, but may be a hexahedron shape. The body 110 may have first and second surfaces 1 and 2 opposing each other in the Z direction of the body 110, third and fourth surfaces 3 and 4 connected to the first and second surfaces 1 and 2 and opposing each other in the X direction of the body 110, and fifth and sixth surfaces 5 and 6 connected to the first and second surfaces 1 and 2, connected to the third and fourth surfaces 3 and 4, and opposing each other in the Y direction of the body 110.

The dielectric layer 111 may include a ceramic powder, for example, a $BaTiO_3$ based ceramic powder or the like.

An example of the barium titanate ($BaTiO_3$) based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, in which Ca, Zr, or the like, is partially dissolved in $BaTiO_3$, but is not limited thereto.

In addition, the dielectric layer 111 may further include a ceramic additive, an organic solvent, a plasticizer, a binder, a dispersant, and the like, in addition to the ceramic powder.

The ceramic additive may include, for example, a transition metal oxide or carbide, a rare earth element, magnesium (Mg), aluminum (Al), or the like.

The first and second internal electrodes 121 and 122, which are electrodes to which different polarities are applied, may be formed on the dielectric layer 111 to be stacked in the Z direction of the body 110, and may be alternately disposed in the body 110 so as to opposite to each other along the Z direction of the body 110 while having one dielectric layer 111 interposed therebetween.

In this case, the first and second internal electrodes 121 and 122 may be electrically insulated from each other by the dielectric layer 111 disposed therebetween.

Meanwhile, the present disclosure illustrates and describes a structure in which the internal electrodes are staked in the Z direction of the body 110, but the present disclosure is not limited thereto and may also be applied to a structure in which the internal electrodes are stacked in the Y direction of the body, if necessary.

One end portion of each of the first and second internal electrodes 121 and 122 may be exposed through the third and fourth surfaces 3 and 4 of the body 110, respectively.

The end portions of the first and second internal electrodes 121 and 122 alternately exposed through the third and fourth surfaces 3 and 4 of the body 110 may be electrically connected to the first and second external electrodes 131 and 132 disposed on the opposite end surfaces of the body 110 in the X direction of the body 110, respectively, to be described below.

According to the configuration as described above, when a predetermined voltage is applied to the first and second external electrodes 131 and 132, electric charges may be accumulated between the first and second internal electrodes 121 and 122.

In this case, a capacitance of the multilayer capacitor 100 may be in proportional to an overlapping area of the first and second internal electrodes 121 and 122 overlapping with each other along the Z direction of the body 110 in the active region.

In addition, a material forming the first and second internal electrodes 121 and 122 is not particularly limited, but may be a conductive paste formed of one or more of, for example, a noble metal material such as platinum (Pt), palladium (Pd), a palladium-silver (Pd—Ag) alloy, or the like, nickel (Ni), and copper (Cu).

At this time, a method of printing the conductive paste may be a screen printing method, a gravure printing method, or the like, but is not limited thereto.

Voltages having different polarities may be provided to the first and second external electrodes 131 and 132, and the first and second external electrodes 131 and 132 may be disposed on the opposite end surfaces of the body 110 in the X direction of the body 110, and may be electrically connected to the exposed end portions of the first and second internal electrodes 121 and 122, respectively.

The first external electrode 131 may include a first connection portion 131a and a first band portion 131b.

The first connection portion 131a may be disposed on the third surface 3 of the body 110, and may be in contact with the end portion of the first internal electrode 121 exposed to the outside through the third surface 3 of the body 110 to serve to electrically connect the first internal electrode 121 and the first external electrode 131 to each other.

The first band portion 131b may be a portion extending from the first connection portion 131a to portions of the first, second, fifth, and sixth surfaces 1, 2, 5, and 6 of the body 110, respectively, to improve fixing strength.

Here, a portion of the first band portion 131*b* formed on at least one surface of the body 110 may have an area greater than that of each of portions of the first band portion 131*b* formed on other surfaces of the body 110.

In the present exemplary embodiment, an area of the portion of the first band portion 131*b* formed on the second surface 2 of the body 110 may be greater than the area of each of the portions of the first band portion 131*b* formed on the first, fifth, and sixth surfaces 1, 5 and 6 of the body 110.

To this end, the portion of the first band portion 131*b* formed on the second surface 2 of the body 110 may have a first extending portion 131*c*.

The second external electrode 132 may include a second connection portion 132*a* and a second band portion 132*b*.

The second connection portion 132*a* may be disposed on the fourth surface 4 of the body 110, and may be in contact with the end portion of the second internal electrode 122 exposed to the outside through the fourth surface 4 of the body 110 to serve to electrically connect the second internal electrode 122 and the second external electrode 132 to each other.

The second band portion 132*b* may be a portion extending from the second connection portion 132*a* to portions of the first, second, fifth, and sixth surfaces 1, 2, 5, and 6 of the body 110, respectively, to improve fixing strength.

Here, a portion of the second band portion 132*b* formed on at least one surface of the body 110 may have an area greater than that of each of portions of the second band portion 132*b* formed on other surfaces of the body 110.

In the present exemplary embodiment, an area of the portion of the second band portion 132*b* formed on the second surface 2 of the body 110 may be greater than the area of each of the portions of the second band portion 132*b* formed on the first, fifth, and sixth surfaces 1, 5 and 6 of the body 110.

To this end, the portion of the second band portion 132*b* formed on the second surface 2 of the body 110 may have a second extending portion 132*c*.

Meanwhile, the first and second external electrodes 131 and 132 may further include a plating layer.

The plating layer may include a nickel (Ni) plating layer, and a tin (Sn) plating layer covering the nickel plating layer.

Figure 4:
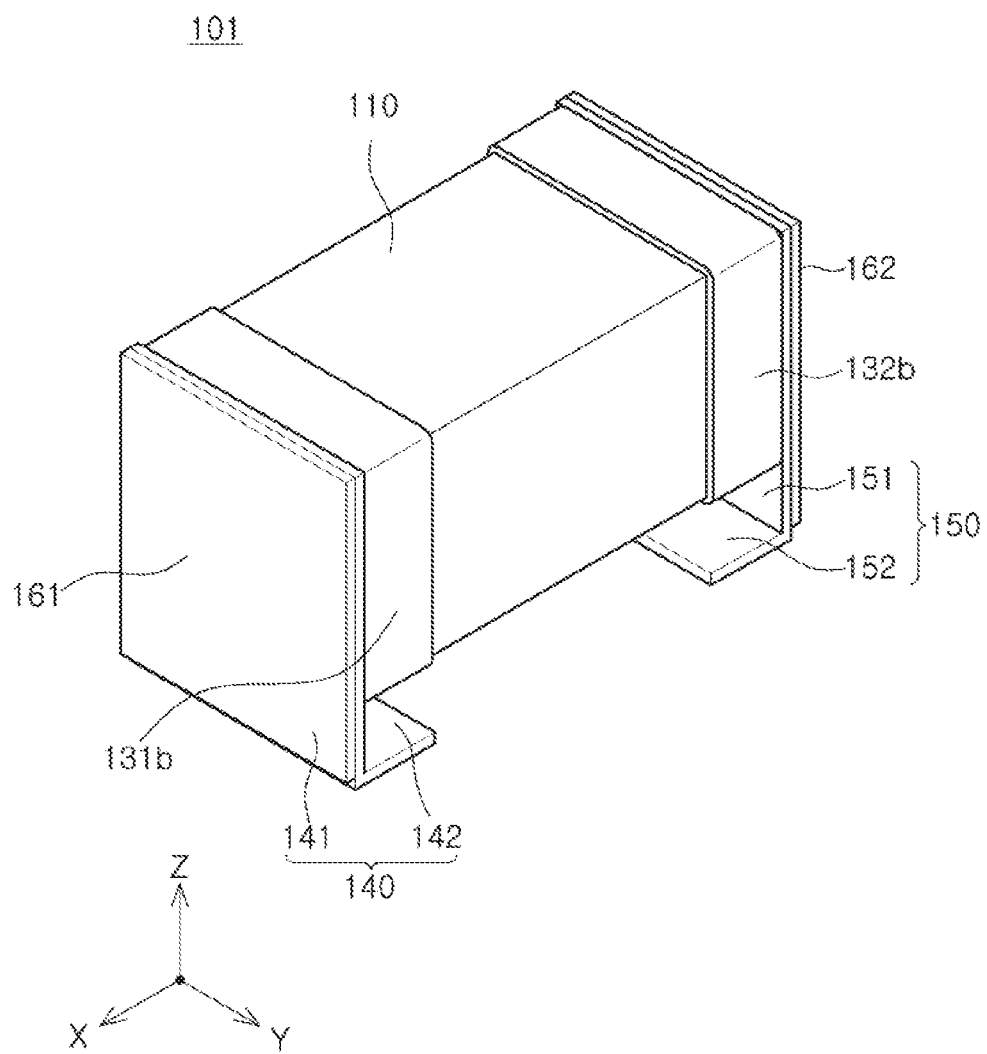
FIG. 4 is a perspective view schematically illustrating an electronic component according to an exemplary embodiment in the present disclosure.
Figure 5:
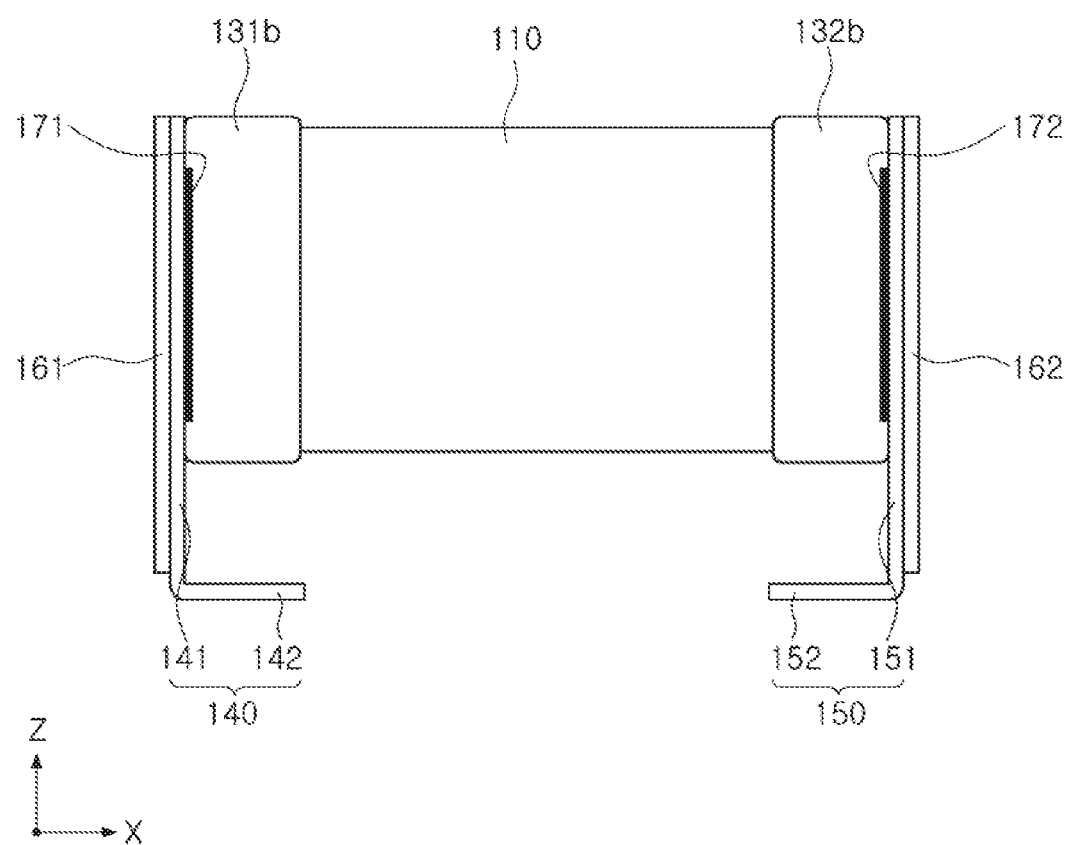
FIG. 5 is a front view of FIG. 4.

FIG. 4 is a perspective view schematically illustrating an electronic component according to an exemplary embodiment in the present disclosure and FIG. 5 is a front view of FIG. 4.

Referring to FIGS. 4 and 5, an electronic component 101 according to the present exemplary embodiment may include the multilayer capacitor 100, and first and second metal frames 140 and 150 connected to the first and second external electrodes 131 and 132 of the multilayer capacitor 100, respectively.

The first metal frame 140 may include a first support portion 141 and a first mounting portion 142.

The first support portion 141 may be a portion which is perpendicular to a mounting surface and is bonded to the first connection portion 131*a* of the first external electrode 131, and may be electrically and physically connected to the first connection portion 131*a* of the first external electrode 131.

Here, a first conductive adhesive layer 171 may be provided between the first external electrode 131 and the first support portion 141.

Such a first conductive adhesive layer 171 may be formed of a high temperature solder, a conductive adhesive material, or the like, but is not limited thereto.

The first mounting portion 142 may be a portion extending in the X direction, which is the first direction from a lower end of the first support portion 141 and formed to be horizontal with respect to the mounting surface, and may serve as a connection terminal when the electronic component is mounted on the substrate.

In addition, the first mounting portion 142 may be disposed to be spaced apart from a lower surface of the multilayer capacitor 100 by a predetermined distance in the Z direction.

The second metal frame 150 may include a second support portion 151 and a second mounting portion 152.

The second support portion 151 may be a portion which is perpendicular to a mounting surface and is bonded to the second connection portion 132*a* of the second external electrode 132, and may be electrically and physically connected to the second connection portion 132*a* of the second external electrode 132.

Here, a second conductive adhesive layer 172 may be provided between the second external electrode 132 and the second support portion 151.

Such a second conductive adhesive layer 172 may be formed of a high temperature solder, a conductive adhesive material, or the like, but is not limited thereto.

The second mounting portion 152 may be a portion extending in the X direction, which is the first direction from a lower end of the second support portion 151 and formed to be horizontal with respect to the mounting surface, and may serve as a connection terminal when the electronic component is mounted on the substrate.

In addition, the second mounting portion 152 may be disposed to be spaced apart from a lower surface of the multilayer capacitor 100 by a predetermined distance in the Z direction.

Meanwhile, the first and second metal frames 140 and 150 may further include a plating layer.

The plating layer may include a nickel plating layer, and a tin plating layer covering the nickel plating layer.

In addition, the electronic component 101 according to the present exemplary embodiment may include a first insulating layer 161 formed on an external surface of the first support portion 141 in the X direction, and a second insulating layer 162 formed on an external surface of the second support portion 151.

The first and second insulating layers 161 and 162 may be formed of a material containing an epoxy, or may be formed of an oxide containing elements such as silicon (Si), aluminum (Al), zirconium (Zi), titanium (Ti), and the like, but are not limited thereto.

The first and second insulating layers 161 and 162 may extend only on outer surfaces of the first and second metal frames 140 and 150, such that the first and second insulating layers 161 and 162 are not disposed on any internal surface of the first and second metal frames 140 and 150.

When the conventional electronic component including the metal frames is mounted on the substrate as amounting area is decreased, a pitch between electronic components adjacent to each other may be reduced.

In particular, the electronic component including the metal frames often includes the multilayer capacitor of a medium or large size.

As a result, as the metal frames of the adjacent electronic components come into contact with each other due to misalignment when the electronic components are mounted, a short circuit defect may easily occur.

However, in a case in which the first and second support portions 141 and 151 and the first and second insulating layers 161 and 162 are formed as in the present exemplary embodiment, even though the electronic components are formed on the substrate while having a narrow pitch, a short circuit between the adjacent electronic components may be prevented.

Experimental Example

Meanwhile, a thickness of each of the first and second insulating layers 161 and 162 may be 0.7 µm or more.

Figure 8:
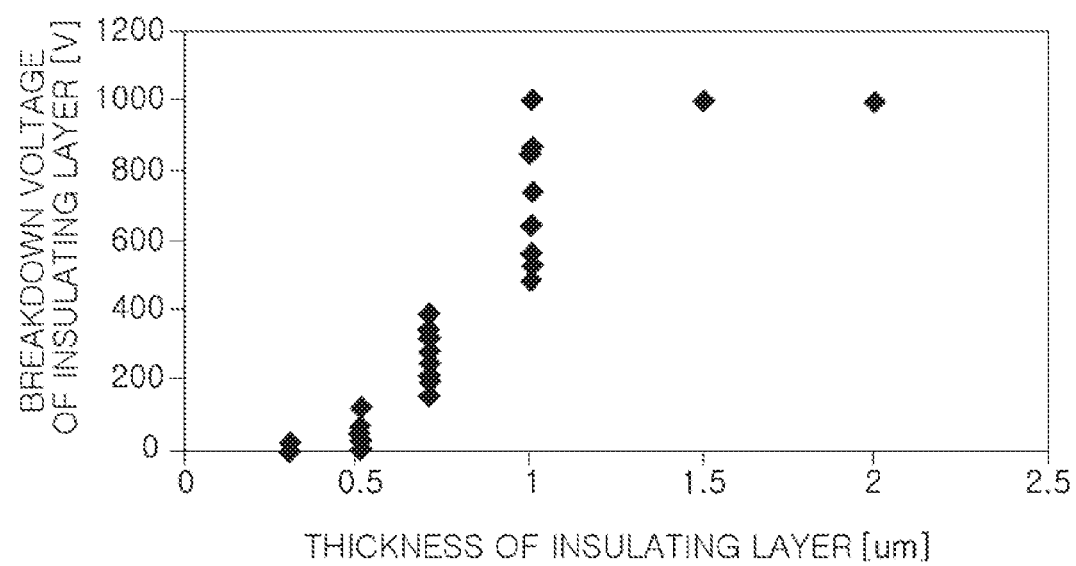
FIG. 8 is a graph illustrating a change in a breakdown voltage of an insulating layer according to a thickness of the insulating layer.

Table 1 and FIG. 8 are graphs illustrating a change in a breakdown voltage of an insulating layer according to a thickness of the insulating layer.

In the multilayer capacitor used in Table 1, a length and a width thereof are 2.0 mm and 1.2 mm, respectively, and the metal frame is bonded to the connection portion of the external electrode of the multilayer capacitor having electrical characteristics of 22 µF by a high temperature solder.

In addition, an insulation material is formed on the external surface of the metal frame for each of thicknesses of the insulating material to evaluate the degree of insulation according to the thickness of the insulating layer.

A breakdown voltage of the insulating layer is a point at which a bias voltage is applied to two electrode surfaces in the same direction, and the insulating layer is destroyed and a current flows.

Here, 1 V may be determined as an initial short circuit defect, and 1000 V may be determined as the maximum value of a measuring instrument and the breakdown voltage is 1000 V or more.

Referring to Table 1, considering that a sample having the breakdown voltage of the insulating layer of 1 V occurs up to the thickness of the insulating layer of 0.5 µm, it may be seen that there is a problem in insulation property because the insulating layer is not properly formed locally when the thickness of the insulating layer is less than 0.7 µm.

In addition, considering that the voltage that may be most severely applied in an environment in which such an electronic component is used is less than 100 V, the thickness of the insulating layer may be 0.7 µm or more.

TABLE 1

Breakdown Voltage of Insulating Layer [V]

| | Thickness of Insulating Layer [µm] | | | | | |
|---|---|---|---|---|---|---|
| | 0.3 | 0.5 | 0.7 | 1.0 | 1.5 | 2 |
| Average | 8 | 39 | 262 | 703 | 1000 | 1000 |
| Stdev | 9 | 24 | 90 | 227 | 0 | 0 |
| min | 1 | 1 | 122 | 328 | 1000 | 1000 |
| max | 24 | 68 | 394 | 1000 | 1000 | 1000 |
| 1 | 1 | 45 | 122 | 328 | 1000 | 1000 |
| 2 | 24 | 1 | 394 | 849 | 1000 | 1000 |
| 3 | 9 | 66 | 162 | 529 | 1000 | 1000 |
| 4 | 1 | 35 | 340 | 740 | 1000 | 1000 |
| 5 | 1 | 29 | 243 | 1000 | 1000 | 1000 |
| 6 | 8 | 58 | 341 | 872 | 1000 | 1000 |
| 7 | 16 | 41 | 331 | 494 | 1000 | 1000 |
| 8 | 19 | 1 | 210 | 567 | 1000 | 1000 |
| 9 | 1 | 46 | 189 | 649 | 1000 | 1000 |
| 10 | 1 | 68 | 287 | 1000 | 1000 | 1000 |

Figure 6:
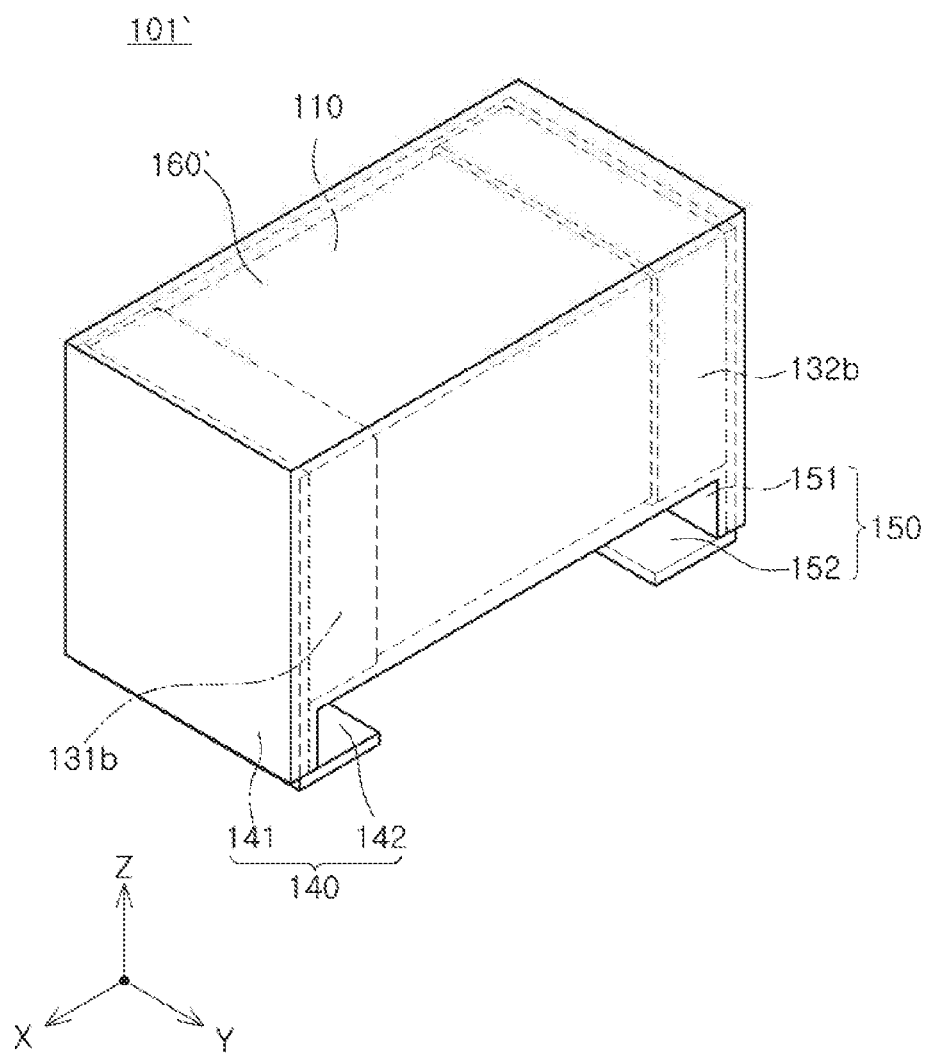
FIG. 6 is a perspective view schematically illustrating an electronic component according to another exemplary embodiment in the present disclosure.
Figure 7:
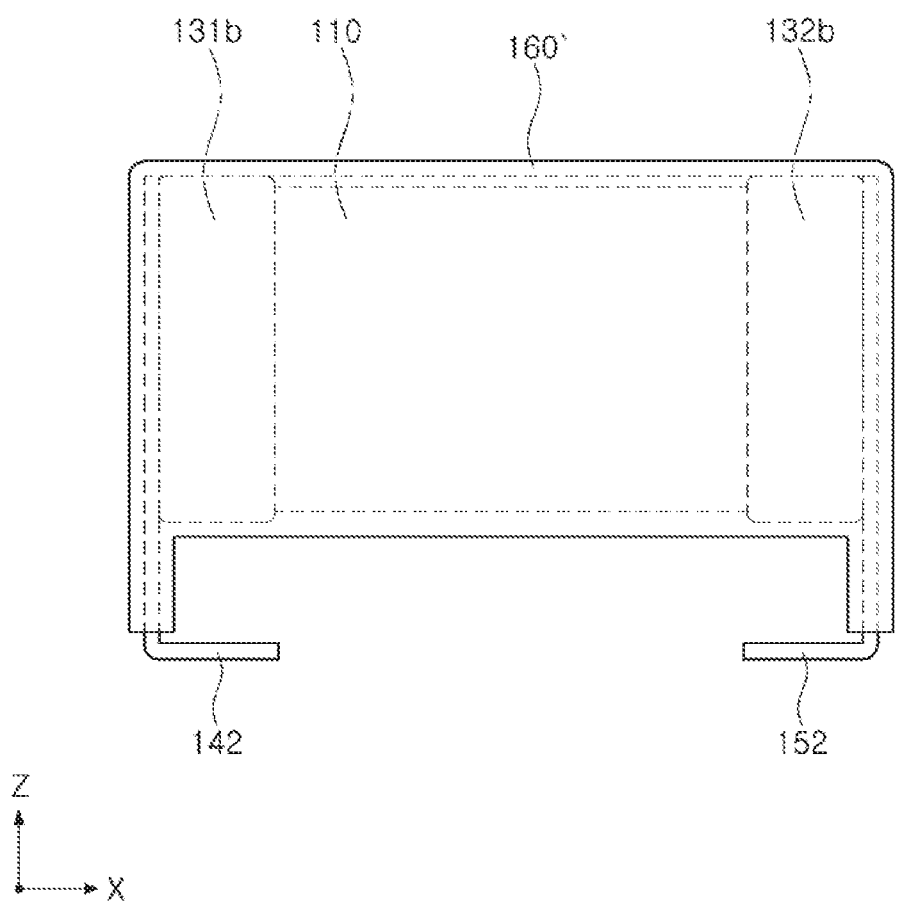
FIG. 7 is a front view of FIG. 6.

FIG. 6 is a perspective view schematically illustrating an electronic component according to another exemplary embodiment in the present disclosure and FIG. 7 is a front view of FIG. 6.

Here, since the structure of the multilayer capacitor and the structure of the metal frame are similar to those of the exemplary embodiment described above, a detailed description thereof will be omitted in order to avoid an overlapping description. A capsule portion having a structure different from that of the exemplary embodiment described above is illustrated and a detailed description will be provided based on the capsule portion.

Referring to FIGS. 6 and 7, an electronic component 101' according to the present exemplary embodiment may further include a capsule portion 160' including the first and second insulating layers and further covering the body 110 and the first and second external electrodes 131 and 132 of the multilayer capacitor 100.

Therefore, the capsule portion 160' may be formed integrally with the first insulating layer 161 and the second insulating layer 162.

When the capsule portion 160' is formed as described above, the capsule portion 160' may prevent the metal frame from being connected to other adjacent land patterns when the electronic component is mounted on the substrate. As a result, an effect of preventing the short circuit defect between the components may be further improved.

As set forth above, according to the exemplary embodiment in the present disclosure, the acoustic noise may be reduced by reducing the vibration generated by the piezoelectric phenomenon in the multilayer capacitor, and the short circuit defect between the components may be prevented by preventing the metal frame from being in contact with other adjacent land patterns when the electronic component is mounted on the substrate.

While exemplary embodiments have been shown and described above, it will be apparent to those skilled in the art that modifications and variations could be made without departing from the scope of the present invention as defined by the appended claims.

What is claimed is:

1. An electronic component comprising:
a body having first and second surfaces disposed to oppose each other in a first direction, third and fourth surfaces connected to the first and second surfaces and disposed to oppose each other in a second direction, and fifth and sixth surfaces connected to the first to fourth surfaces and disposed to oppose each other in a third direction;
first and second external electrodes including first and second connection portions disposed on the first and second surfaces, respectively, and first and second band portions extended from the first and second connection portions, respectively, to portions of the third, fourth, fifth and sixth surfaces; and
first and second metal frames connected to the first and second external electrodes, respectively,
wherein the first and second metal frames include first and second support portions bonded to the first and second connection portions, and first and second mounting portions extended in the first direction from lower ends of the first and second support portions and spaced apart from the body and the first and second external electrodes, and further include first and second insulating layers disposed on external surfaces of the first and second support portions,
the first and second insulating layers disposed on the external surfaces of the first and second support portions, respectively, each extend continuously from at least an upper end of the first or second support portion to beyond, in the second direction, a lower surface of an insulating layer disposed on the lower surface of the body, the first and second insulating layers have a length which is shorter than a length of the first and second support portions, respectively, in the second direction, and the first and second insulating layers have a flat bottom surface.

2. The electronic component of claim 1, wherein a thickness of each of the first and second insulating layers is 0.7 μm or more.

3. The electronic component of claim 1, further comprising a capsule portion including the first and second insulating layers and the insulating layer disposed on the lower surface of the body and further covering the body and the first and second external electrodes.

4. The electronic component of claim 1, wherein the body includes dielectric layers, and first and second internal electrodes alternatively disposed while having the dielectric layer interposed therebetween and exposed in the first direction through the opposing surfaces of the body so that one end of each of thereof is connected to each of the first and second connection portions.

5. The electronic component of claim 1, wherein first and second conductive adhesive layers are provided between the first and second connection portions of the first and second external electrodes and the first and second support portions, respectively.

6. The electronic component of claim 1, further comprising a plating layer disposed on the first and second external electrodes and the first and second metal frames, respectively.

7. The electronic component of claim 6, wherein the plating layer includes a nickel plating layer and a tin plating layer covering the nickel plating layer.

8. The electronic component of claim 1, wherein the first and second insulating layers contain an epoxy.

9. The electronic component of claim 1, wherein the first and second insulating layers contain an oxide of at least one selected from the group of silicon (Si), aluminum (Al), zirconium (Zi) and titanium (Ti).

10. The electronic component of claim 1,
wherein the first and second insulating layers are spaced apart from the first and second connection portions of the first and second external electrodes, respectively, by the first and second metal frames.

11. An electronic component comprising:
a body having first and second surfaces disposed to oppose each other in a first direction, third and fourth surfaces connected to the first and second surfaces and disposed to oppose each other in a second direction, and fifth and sixth surfaces connected to the first to fourth surfaces and disposed to oppose each other in a third direction;

first and second external electrodes including first and second connection portions disposed on the first and second surfaces, respectively, and first and second band portions extended from the first and second connection portions, respectively, to portions of the third, fourth, fifth and sixth surfaces; and first and second metal frames connected to the first and second external electrodes, respectively, wherein the first and second metal frames include first and second support portions bonded to the first and second connection portions, and first and second mounting portions extended in the first direction from lower ends of the first and second support portions and spaced apart from the body and the first and second external electrodes, and further include first and second insulating layers disposed on external surfaces of the first and second support portions, and the first and second insulating layers are disposed only on surfaces of the first and second support portions, from among surfaces of the body and the first and second support portions, and each extend continuously from an upper end of the first or second support portion to beyond, in the second direction, a lower surface of the body.

12. The electronic component of claim 11, wherein a thickness of each of the first and second insulating layers is 0.7 μm or more.

13. The electronic component of claim 11, wherein the body includes dielectric layers, and first and second internal electrodes alternatively disposed while having the dielectric layer interposed therebetween and exposed in the first direction through the opposing surfaces of the body so that one end of each of thereof is connected to each of the first and second connection portions.

14. The electronic component of claim 11, wherein first and second conductive adhesive layers are provided between the first and second connection portions of the first and second external electrodes and the first and second support portions, respectively.

15. The electronic component of claim 11, further comprising a plating layer disposed on the first and second external electrodes and the first and second metal frames, respectively.

16. The electronic component of claim 15, wherein the plating layer includes a nickel plating layer and a tin plating layer covering the nickel plating layer.

17. The electronic component of claim 11, wherein the first and second insulating layers contain an epoxy.

18. The electronic component of claim 11, wherein the first and second insulating layers contain an oxide of at least one selected from the group of silicon (Si), aluminum (Al), zirconium (Zi) and titanium (Ti).

19. The electronic component of claim 11, wherein first and second insulating layers are disposed only on outer surfaces of the first and second metal frames, such that the first and second insulating layers are not disposed on any internal surface of the first and second metal frames.

20. The electronic component of claim 11, wherein the first and second support portions of the first and second metal frames have internal surfaces facing and directly bonded to the first and second connection portions, respectively, and the first and second insulating layers are disposed on the external surfaces of the first and second support portions opposite the internal surfaces thereof.

* * * * *